United States Patent
Zinkovsky et al.

(10) Patent No.: US 9,064,049 B2
(45) Date of Patent: Jun. 23, 2015

(54) REMOTE DEBUGGING OF SERVER SIDE CODE WITHOUT BLOCKING OR HIGH-LEVEL PRIVILEGES

(75) Inventors: Igor A. Zinkovsky, Bellevue, WA (US); Marcin Sawicki, Kirkland, WA (US); Jonathon Michael Stall, Bothell, WA (US); Anthony L. Crider, Mill Creek, WA (US); Thomas E. Quinn, Jr., Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 701 days.

(21) Appl. No.: 12/967,058

(22) Filed: Dec. 14, 2010

(65) Prior Publication Data

US 2012/0151452 A1 Jun. 14, 2012

(51) Int. Cl.
- G06F 15/16 (2006.01)
- G06F 11/36 (2006.01)
- H04L 29/06 (2006.01)
- G06F 9/44 (2006.01)

(52) U.S. Cl.
CPC ............... *G06F 11/362* (2013.01); *G06F 9/44* (2013.01); *G06F 15/16* (2013.01); *H04L 65/1066* (2013.01)

(58) Field of Classification Search
CPC .......... G06F 9/44; G06F 15/16; H04W 76/04; H04L 65/1066; H04M 1/7253
USPC .................... 717/128–129; 709/228
See application file for complete search history.

(56) References Cited

U.S. PATENT DOCUMENTS

| | | | |
|---|---|---|---|
| 6,324,683 B1 * | 11/2001 | Fuh et al. | 717/124 |
| 7,117,483 B2 * | 10/2006 | Dorr et al. | 717/124 |
| 7,444,552 B2 * | 10/2008 | Kilian | 714/43 |
| 7,752,315 B2 | 7/2010 | Da Palma et al. | |
| 7,992,133 B1 * | 8/2011 | Theroux et al. | 717/124 |
| 2002/0188930 A1 * | 12/2002 | Moser et al. | 717/129 |
| 2004/0205720 A1 * | 10/2004 | Hundt | 717/124 |
| 2006/0101405 A1 * | 5/2006 | Buschardt et al. | 717/124 |
| 2008/0059964 A1 * | 3/2008 | Khodabakchian et al. | 718/100 |
| 2009/0132666 A1 * | 5/2009 | Rahman | 709/206 |
| 2010/0131744 A1 * | 5/2010 | Mandal et al. | 712/227 |
| 2010/0162049 A1 | 6/2010 | Stall et al. | |
| 2010/0192121 A1 | 7/2010 | Unnithan et al. | |
| 2010/0242026 A1 * | 9/2010 | Bates et al. | 717/128 |
| 2011/0047415 A1 * | 2/2011 | Nanjundaswamy | 714/37 |
| 2012/0084758 A1 * | 4/2012 | Bates | 717/125 |
| 2013/0097332 A1 * | 4/2013 | Malladi et al. | 709/230 |

OTHER PUBLICATIONS

Pierson, Harry. "Microsoft.Scripting.Debugging", Retrieved at << http://devhawk.net/CategoryView,category,Debugger.aspx >> , Jul. 8, 2009, pp. 31.

(Continued)

*Primary Examiner* — John Breene
*Assistant Examiner* — Lynda Dinh
(74) *Attorney, Agent, or Firm* — Sunah Lee; Kate Drakos; Micky Minhas (57) ABSTRACT

A server exposes debugger services to a plurality of debugger clients. One or more debugger clients can select a debug operation and establish a debug session in a thread of a server process for debugging user code. A two-way debug communication pipeline can be established between a debugger client and the server using standard encoding protocols and standard network transport protocols. A two-way debug communication pipeline can be established using HTTP where the server can initiate a communication with the debugger client using a long polling technique. When one of the threads of the server process is suspended, the other threads in the server process continue to execute.

20 Claims, 4 Drawing Sheets

(56) References Cited

OTHER PUBLICATIONS

Tan, et al., "Extending the Message Flow Debugger for MQSI", Retrieved at << http://www-users.cs.york.ac.uk/~paige/Writing/cascon01.pdf >>, IBM Centre for Advanced Studies Conference, Proceedings of the 2001 conference of the Centre for Advanced Studies on Collaborative research 2001, Nov. 5-7, 2001, pp. 12.

"vdebug", Retrieved at << http://code.google.com/p/vdebug/ 2010 >>, Retrieved Date: Oct. 1, 2010, pp. 4.

* cited by examiner

REMOTE DEBUGGING OF SERVER SIDE CODE WITHOUT BLOCKING OR HIGH-LEVEL PRIVILEGES

BACKGROUND

A debugger is a tool which enables a programmer to monitor the execution of a program. A debugger can stop execution of a program being debugged, re-start it, set breakpoints in the program, and/or access or change values in memory. A debugger can enable a program to be run step by step (called stepping), to stop at a particular line of code when a breakpoint is encountered (breaking) and can enable the value of variables to be inspected when the program is at a breakpoint or while the program is running (inspection). Some debuggers can also modify program state while the program is running, in addition to observing and reporting on program state. Some debuggers can display and navigate the callstack, enabling the user to skip over parts of code while stepping, or to restart the execution from a potentially arbitrary line of code. Other functions of debuggers include listing and debugging multiple threads at the same time, enabling hit counting.

Hence, debuggers are typically very powerful. Moreover, the same functionality that makes a debugger useful for finding bugs also makes it useful as a software cracking tool to retrieve sensitive information, evade copy protection, circumvent digital rights management, and so on. Hence a user who does not have high-level privileges typically cannot run a debugger process.

When software running in a process is being debugged, other threads running in the process can be affected. For example, if a server process is being debugged, clients accessing the server may experience a slow down in server response time or the application being debugged (and all the clients accessing the application being debugged) may even freeze.

SUMMARY

A cooperative, non-blocking, non-invasive debugger can execute on a server in a network environment to debug client user code. The execution environment that runs the user code on the server can cooperate with and enable the debugger. A remote debugging channel that supports a two-way communication pipeline between a debugger client and the debugger on the server can use a standard protocol such as but not limited to HTTP (Hypertext Transfer Protocol) and/or TCP (Transmission Control Protocol) or a custom network protocol. Long-polling can be used to implement the two-way communications debugging channel. Debugger messages can be serialized and/or encoded using standard protocols including but not limited to XML (Extensible Mark-up Language), SOAP (Simple Object Access Protocol) and/or JSON (JavaScript Object Notation).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Traditionally, the only people who were interested in debugging code that executes on a server were the developers of server applications. Debugging server code was typically performed on a server that was removed from production so that the debugging activities did not interfere with clients accessing the server. With the advent of cloud computing however, more and more users are developing code that has to be tested and debugged on a production server. Moreover, multiple users may want to do remote debugging at the same time. Because the cloud is a multi-tenancy environment, it is increasingly valuable and necessary to enable multiple users to debug their server-side code instances simultaneously within the same server process, even when the users are in distant parts of the world, do not know each other, do not know of each other, and/or do not control what runs in the server process. Users need to be able to debug their code instances without having any impact on each other or on anyone else being served by the process in any way.

Today, the technologies that enable the debugging of user code typically block the debuggee process within which the user code being debugged is running and make that process unavailable for other tasks. Blocking a server process in a production environment can be particularly disruptive because a given server machine has a limited number of processes, but potentially many user sessions can be handled by a single process. Once a server debugger is attached to user code, and a breakpoint is hit, all the threads in the process are frozen, preventing the server from serving any of the other users of that process. Therefore, debugging just one user's code can block a server process and significantly limit that server's ongoing ability to serve other clients.

In computing, privileges control what a user can and cannot do. Examples of privileges are the privilege to create a file in a directory, the privilege to read a file, the privilege to delete a file, the privilege to access a device, the privilege to read or write to a socket for communicating over the Internet and so on. Many modern processor architectures have CPU modes that allow the operating system to run at different privilege levels. Processes, resources and instructions which access resources are tagged with a privilege level. When a process tries to use a resource or attempts to execute a privileged instruction, the processor determines whether or not it has permission to do so, and either permits or denies the operation. This prevents user processes from damaging the operating system or from damaging other processes running on the machine. Some processors support two levels of privilege, such as user (low privilege) and supervisor (high privilege). Other processors have four levels, with level #0 having the most privileges (high privilege) and level #3 having the fewest privileges (level #2 and level #3 may be considered low privilege).

In general, elevated privilege is needed to debug a debuggee process. When debugging locally, (e.g., a user is debugging a program on his own computer) it typically does not matter which of the two (debugger or debuggee) is more privileged because all the information on the computer typically belongs to the same user. Remote debugging is more problematic. Because of the potentially significant impact of debugging user code, server-side debugging typically requires high-level privileges. This can make debugging server-side user code practically unavailable for low-privileged users.

Traditional debugging approaches can have undesirable and invasive side effects. For example, typically, only a single executing instance of a debugger can be attached to a debuggee process. It is not typically permitted for two or more executing instances of the same debugger or two or more executing instances of different debuggers to be attached to a single debuggee process. Traditional solutions that allow a client to debug on a server can compromise security. For example, because the debugger interrogates the target (the program being debugged), and has extensive control over the process, the debugger, and thus a client running the debugger, can ask for any desired information, can extract any information it wants, and can control what runs and what does not run. If a breakpoint is encountered in the code being debugged, the entire process is stopped to allow the inspection of process values at the breakpoint. This means that any other user of the process is frozen unless and until the debugging client resumes processing. Alternative solutions prohibit the client from debugging at all on the server.

In accordance with aspects of the subject matter disclosed herein, non-invasive, non-blocking debugging of server-side user code can be achieved through cooperation between the server execution environment and a cooperative debugger executing on the server. Debugging services on the debugger server are available to users who lack high-level privileges. A cooperative debugger in this context refers to a remote debugger executing on a server which cooperates with the execution environment of the server to provide debugging services to debugger clients. The executing thread of a cooperative debugger executing on a server can call into the debugger client at sequence point code locations that are possible locations for breakpoints. The debug state of the server debugger can be passed to the debugger client. Cooperative debugging can be provided by a service which the execution environment of the server supports, to avoid invasiveness, the need for high-level privileges, blocking, the single debugger constraint issue and so on. Cooperative debugging can be implemented through traceback instrumentation, interpretation, or by other mechanisms.

The execution environment and the cooperative, non-invasive, non-blocking debugger can expose debugging services to debugger clients. A debugger client can inspect and drive the state of the executing user code by communicating with the server debugger through the debugger services. Communication between the debugger client and the server debugger can be serialized and transmitted across network remoting boundaries. Remoting boundaries can exist in an intranet, the Internet, a LAN (local area network), a WAN (wide area network), and so on and can also exist between processes executing on the same computer. The communication between the debugger client and the debugger executing on the server can be generalized into a duplex message passing system, in which messages are encoded using SOAP, XML, JSON or any other standard or custom protocol. The delivery or transport of each message between the debugger on the server and the debugger client can be performed through a network transport protocol suited to the application being debugged. Some examples of network protocols include but are not limited to TCP, UDP (User Datagram Protocol), HTTP, SOAP/REST (Simple Object Access Protocol/Representational State Transfer) web services and so on.

Remote Debugging of Server Side Code without Blocking or High-Level Privileges

Figure 1:
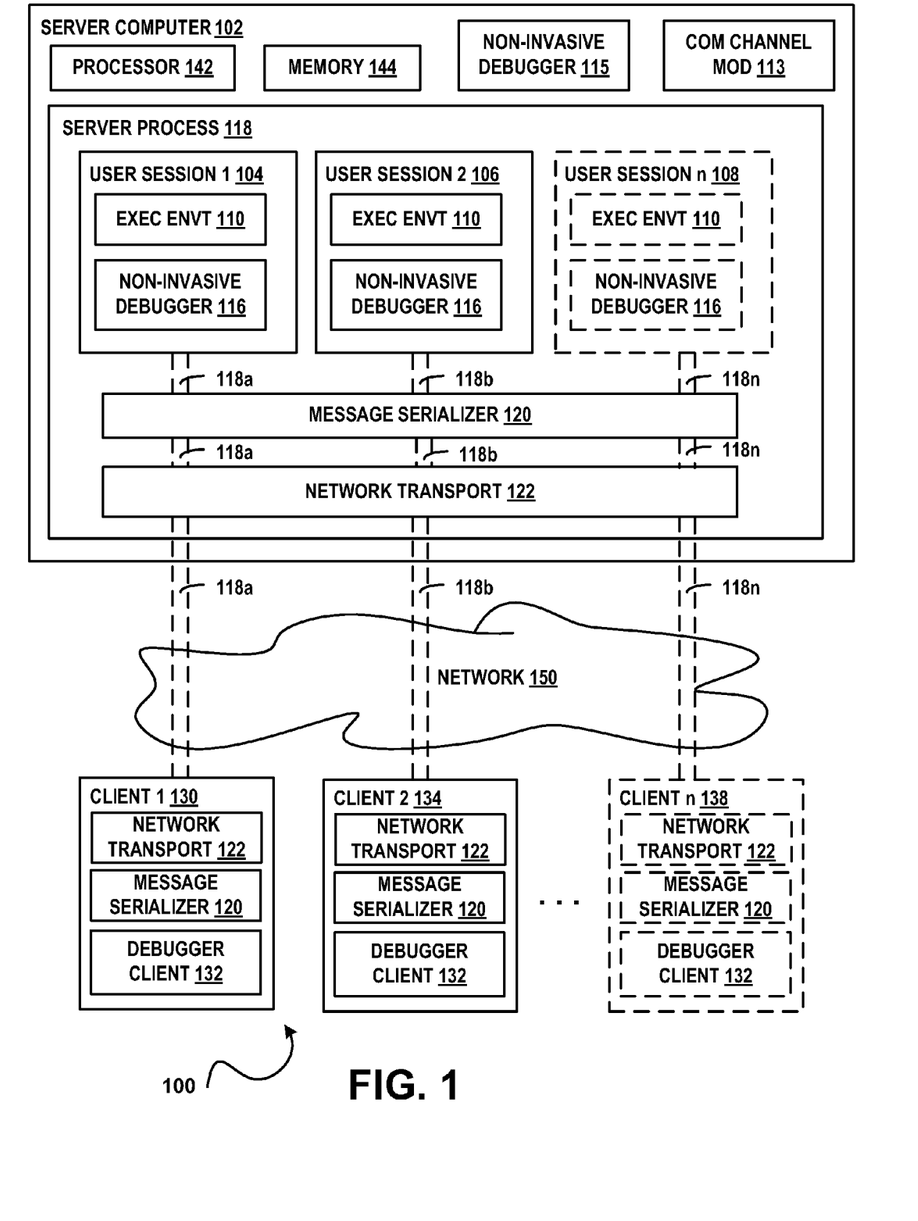
FIG. 1 is a block diagram of an example of a system 100 for remote debugging of server-side code without blocking or high-level privileges in accordance with aspects of the subject matter disclosed herein.

FIG. 1 illustrates an example of a system 100 that enables remote debugging of server side code in accordance with aspects of the subject matter disclosed herein. All or portions of system 100 may reside on one or more computers such as the computers described below with respect to FIG. 3. The system 100 or portions thereof may comprise a portion of an integrated design environment 600 (IDE) such as the ones described and illustrated below with respect to FIG. 4, residing on one or more computers such as the computers described with respect to FIG. 3 also described below. Alternatively, system 100 or portions thereof may be provided as a stand-alone system or as a plug-in.

System 100 may include one or more of the following: one or more server computers such as server computer 102, etc., and/or one or more client computers such as client 1 130, client 2 134, ... client n 138, etc. A server computer such as server computer 102 may include one or more processors such as processor 142, a memory 144, and one or more modules that implement a cooperative, non-invasive, non-blocking debugger such as debugger 115. Server computer 102 can also include one or more modules such as module 113 that establishes a two-way debug communication pipeline between a client computer and the server computer. It will be appreciated that the above described modules can be loaded into memory 144 to cause one or more processors such as processor 142 to perform the actions attributed to the module(s).

One or more server processes can execute on the server computer 102. A server process such as server process 118 executing on the server computer 102 can include one or more executing threads or sessions such as user session 1 104, user session 2 106 ... user session n 108 in which an instance of the cooperative, non-invasive, non-blocking debugger (e.g., debugger instance 116) is executing. Each user session can include an execution environment such as execution environment 110 that supports or cooperates with the cooperative, non-invasive, non-blocking debugger and an instance of the cooperative, non-invasive, non-blocking debugger 116. It will be appreciated that the execution environment and the non-blocking debugger stacks need not be the same for different user sessions. For example, a configuration in which a first user executes/debugs VB.NET code, while a second user executes/debugs JavaScript code is feasible.

Clients such as client 1 130, client 2 134, ... client n 138, etc. may include modules including a debugger client 132, a message serializer 120 and a network transport. As described herein, each client and corresponding user session can be associated with a remote debugging channel that supports a two-way communication pipeline between a debugger client and the server side debugger, represented in FIG. 1 by debugging channel 118a for communication between user session 1 104 and client 1 130, debugging channel 118b for communication between user session 2 106 and client 2 134 ... debugging channel 118n for communication between user session n 108 and client n 138.

A cooperative, non-invasive, non-blocking debugger can be achieved in various ways such as, for example, by using an interpreter that interprets script code line by line. For example, for each line, the interpreter can insert a breakpoint so that if the debugger stops at a breakpoint, the executing thread that is interpreting the script stops. In this way, only the executing thread is stopped at the breakpoint and all the other threads within the process can continue to execute. Another way of implementing a cooperative, non-invasive, non-blocking debugger is by instrumenting code using tracebacks or callbacks. Before each breakpoint is encountered, a callback function can be called. Other methods of implementing a cooperative, non-invasive, non-blocking debugger are also contemplated.

In accordance with aspects of the subject matter disclosed herein, however the cooperative, non-invasive, non-blocking debugger is implemented, the execution environment on the server computer hosting the cooperative, non-invasive, non-blocking debugger supports cooperative, non-invasive, non-blocking debugging. The execution environment supports the debugger by providing debugging services needed by the debugger. These services may include calling into the debugger to indicate when sequence points are reached (regardless of whether the execution environment is interpreted or instrumented with tracebacks, etc.). Other services may include inspection and manipulation of local variables, expression evaluation, transferring control to a different execution location, and so on. The cooperative, non-invasive, non-blocking debugger on the server computer 102 can expose a set of operations to which a client can connect. Upon establishment of the connection and the debugging channel, the client can inspect the state of the debugger.

Traditional debuggers do not attach to threads, they attach to a process. Consequently, when the process is stopped to examine its execution state, all the threads in the process are stopped. In contrast, in accordance with aspects of the subject matter disclosed herein, a cooperative, non-invasive, non-blocking debugger attaches to a single thread in a process. Consequently, when a breakpoint is encountered in a thread or when another event causing suspension of execution is encountered in the thread, only that single thread is stopped. During execution, the thread periodically calls a function that determines whether or not the thread needs to stop execution so that a debugger may examine that (and no other) thread's execution state. If the function determines that the thread needs to stop, that thread is "put to sleep" by placing the thread in a wait state. The thread does not "wake up" or resume until it receives a "wakeup" or "resume" event. When the wakeup or resume event is raised, the thread wakes up and resumes execution. Because only the affected thread is put to sleep, all the other threads in the process continue to execute code normally. It will be appreciated that this represents one possible way that non-blocking remote debugging can be realized. There are other possibilities that do not necessarily require the thread to be put to sleep. However implemented, the resultant effect is the same: no other actively executing thread is affected by the debugging state of a given thread.

Client 1 130, client 2 134 . . . client n 138 can be clients separated from the server computer 102 and from the cloud by a remoting boundary comprising a network 150 such as an intranet, the Internet, a LAN, a WAN or by any network boundary. Alternatively, the cooperative, non-invasive, non-blocking debugger and the debugger client can execute on the same computer and the boundary can be a process boundary (not shown). Client 1 130, client 2 134 . . . client n 138 can exist behind a firewall. The server computer 102 can be separated from the client by a remoting boundary comprising an intranet, the Internet, a LAN, a WAN or by any network boundary. The server computer 102 can exist behind a firewall. A remoting boundary can exist between the cloud and the client and/or between the cloud and the server computer. Client 1 130, client 2 134 . . . client n 138 may access the server computer 102 by a public connection point that accesses a load balancer. The load balancer can delegate the work to one of a plurality of servers, which may be protected by a firewall. Considerations of issues of security, firewalls, network address translators (NATs), network topologies and network latency can affect how the communication mechanism between client and server is implemented.

A message serializer 120 on the server computer 102 can serialize a communication from a user session executing in the server process 118. The communication can be addressed to a client user such as client 1 130, client 2 134 to client n 138. Similarly the message serializer 120 on a client computer can serialize a communication from a client such as client 1 130, client 2 134 . . . client n 138 to a server computer 102. It will be appreciated that different serializers can be accommodated on the server computer 102 for different processes. The communication between the debugger client and the debugger executing on the server computer 102 can be generalized into a duplex message passing system, in which messages are encoded using SOAP, XML, JSON or any other standard or custom protocol. It will be appreciated that different transport protocols can be accommodated on the server computer 102 for different processes.

Messages that can be exchanged between client and the server computer 102 can include messages sent from the client to the server, including but not limited to: a message that gets one or more threads (e.g., GetThreads), a message that looks up a source file (e.g., LookupSourceFile), a message that requests an asynchronous break (e.g., RequestAsyncBreak), a message that sets a breakpoint (e.g., SetBreakpoint), a message that begins a stepping operation (e.g., BeginStep), a message that cancels a stepping operation (e.g., CancelStep), a message that sets a value for a next statement (e.g., SetNextStatement), a message that gets one or more local variable values (e.g., GetLocals), a message that changes the value of one or more local variables (ChangeLocals), a message that gets one or more arguments (e.g., GetArgs), a message that requests evaluation of an expression (e.g., EvaluateExpression), a message that issues a run command (e.g., Run) and/or a message that closes a debug session (e.g., CloseSession). Each message can include one or more parameters. Messages that can be exchanged between a client and the server computer 102 can include messages sent from the server to the client, including but not limited to: a message that notifies the client of a debug event (e.g., NotifyDebugEvent). Parameters can specify the nature of the event that occurred that caused the server to contact the client.

A logical representation of a particular message such as a SetBreakpoint message that is sent by the client to the server can include information such as the file name or file identifier of the code file where the breakpoint is being set and the source span of the breakpoint (i.e., the location of the code fragment in the file, such as for example, the start and end line and start and end column). It will be appreciated that other messages will include other appropriate information.

A message serialized and/or encoded by the message serializer can be transported via a custom or standard network transport protocol 122 on the server to the debugger client and via a custom or standard network transport protocol 122 from the debugger client to the server over the debugging channel. Standard network transport protocols include but are not limited to TCP, UDP, HTTP, SOAP/REST web services and so on.

A remote debugging channel that supports a two-way communication pipeline between client and server or between the server and client using a one-way transport protocol can be established. The remote debugging channel can use a standard protocol such as but not limited to HTTP, TCP, UDP, and/or SOAP/REST web services or can use a custom network protocol. Either the server or the client can initiate communication using the two-way channel of the client/server, server/client communication pipeline. It will be appreciated that because communication systems can have different requirements there can be different ways of establishing the remote debugging communication pipeline between client and server or between server and client. One way to establish a two-way communication using a one-way transport protocol is by using a long polling or server push technique.

Long polling (also called server push) is a variation of the traditional polling technique that emulates an information push from a server to a client. In long polling, the client requests information from the server in a similar way to a normal poll but if the server does not have any information available for the client, instead of sending an empty response, the server holds the request and waits for some information to be available. Once the information becomes available (or after a suitable timeout), a complete response is sent to the client. Typically, the client then immediately requests information again from the server, so that the server will usually have an available waiting request that it can use to deliver data in response to an event. In accordance with aspects of the subject matter disclosed herein, the long polling technique is used over HTTP. HTTP is a one-way protocol initiated by a client such that in response to the client request, a server comes back with a response. An HTTP request is a pull request: a client issues a request to a server and the server sends a response to the client request. A server cannot make a push response using HTTP. That is, a server cannot send an unsolicited message to a client. To satisfy the need for the server debugger to initiate a communication to the debugger client, a server push notification using HTTP as described above can be implemented.

After the communication channel is established between the client and the server, debugging communications can ensue. Debugging communications can include but are not limited to: the debugger client setting a breakpoint at a certain line in the user code, the server sending a notification to the debugger client that a particular breakpoint has been hit, a debugger client requesting the value of a local variable or requesting evaluation of an expression, a debugger client requesting inspection of the call-stack, the debugger client requesting inspection of threads, a debugger client requesting to step-over to the next statement causing execution to continue and then immediately break on the next statement of the current function and/or the debugger client requesting to step-into a function, causing the execution to continue and then immediately break on the first statement of the function being called and so on. When a breakpoint in one of the threads of the server process is encountered, only the execution of that thread is suspended. The other threads in the server process remain active and continue execution.

It will be appreciated that a suspension of a thread can occur for reasons other than encountering a breakpoint. For example, while at a breakpoint, the debug client may request a step operation, causing the execution to continue and then immediately break again when the next statement is executed. This sequence of events causes suspension of the thread in a fashion that is similar to hitting a breakpoint. Additionally, when the user code is executing, the debug client may issue an asynchronous break request. This instructs the debugger to break the execution as soon as possible, also causing suspension of the thread.

It will be appreciated that the subject matter disclosed herein can be applied to activities having purposes that are not limited to debugging. For example, a client side tool that performs runtime code analysis of code running on the server may use the methodology described herein. Code analysis can be performed for purposes including but not limited to code optimization, data mining, performance analysis and so on. Similarly, instead of a developer interacting with an IDE or source code development application on the client side, an automated process may put "breakpoints" in various places in program code. When a breakpoint is encountered, the software may perform code flow analysis or information logging (for purposes including but not limited to performance testing, code usage statistics gathering and so on). In this way, potentially slow and long running client/server processes can occur without impacting other code running on the server.

Figure 2:
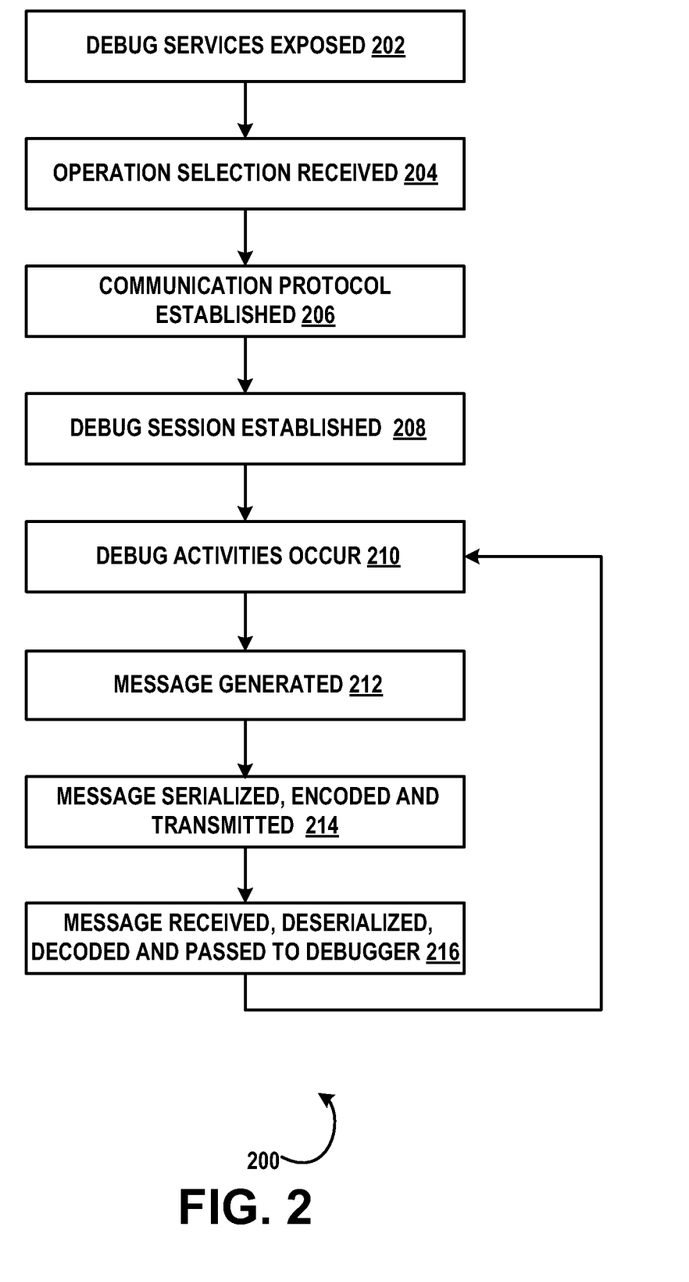
FIG. 2 is a flow diagram of an example of a method 200 for remote debugging of server-side code without blocking or high-level privileges in accordance with aspects of the subject matter disclosed herein.

FIG. 2 illustrates a method 200 for remote debugging of server side code without blocking or high-level privileges in accordance with aspects of the subject matter disclosed herein. Method 200 may be executed on a system such as system 100 described above with respect to FIG. 1. Some of the actions described below may be optional. Some of the actions described below can execute in a sequence other than that depicted. As described above, debugging operations performed by a debugger on the target (debuggee) include stopping (pausing) execution of a program being debugged when a breakpoint is encountered. In traditional models, when a breakpoint is encountered, execution of all threads in the process stop, and inspection of call stack and local variables is allowed. Stepping over a line of code to the next line of code is another common debug operation. In traditional debug models, a user breakpoint is implemented via a CPU breakpoint instruction which, when executed, triggers the CPU and the OS to halt the entire target process, including all threads within that process, so that a debuggee can inspect the process. The debugger has complete control over the target debuggee. Thus if a client is debugging on a server, the client controls the server.

In accordance with aspects of the subject matter disclosed herein, an executing thread can actively cooperate with a server-side debugger component. On a server process executing a plurality of executing threads, only a subset of those executing threads may actually be cooperating with the debugger. Of the threads cooperating with the debugger, only a thread which has reached a point in execution that is determined to be a breakpoint will be suspended and only as a consequence of being in that cooperative state. No other thread is subject to stopping since it is the server-side debugger component which suspends the thread by causing the thread to enter a wait state. When the appropriate event is raised that will cause the wait state to end, the "broken" thread resumes execution. Because each cooperating thread has its own execution state and therefore its own breakpoint conditions, each cooperating thread will be suspended independently from any other, solely based on its own execution state and breakpoint conditions so indicate.

In accordance with aspects of the subject matter disclosed herein, debugging of user code on the server can be performed in a modified way so the debug operations do not block or control the server and can be performed by a user who lacks high-level privileges. At 202 a server computer can expose a set of operations to which a client can connect. The exposed set of operations can enable the connected client to inspect the state of a cooperative, non-invasive, non-blocking debugger executing user code on the server. At 204 a debugger client can select one of the operations to perform and the server computer can receive the client's selection. At 206 a communication protocol can be established between the client and the server. The server and the client can, for example, agree on a serialization and encoding format such as but not limited to an XML, SOAP, JSON or custom format. The server and the client can also agree on a transport protocol such as but not limited to a custom or standard network transport protocol including but not limited to TCP, UDP, HTTP, SOAP/REST web services and so on. A two-way debug communication pipeline can be established between the server and the client.

At 208 a remote user debug session can be initiated on the server. The remote debug session can be initiated from within an IDE or from outside of an IDE on the client machine. The remote debug session can execute a cooperative, non-invasive, non-blocking debugger such as the server debugger described with respect to FIG. 1. A local user debug session can be initiated on the client machine. At 210 debugging activities inside or outside of the IDE can be performed on a client machine. For example, suppose a debugging activity is setting a breakpoint at a particular location in a particular function. Debugging activities can also occur at the server machine. At 212 in response to the debugging activities on either the client or the server, a debug message can be created and a communication can be initiated by either the client or the server.

Suppose for example, that a user has an IDE open on the client machine and the IDE is displaying some user code. The user may set a breakpoint on a line of code displayed in the IDE on the client machine. A message can be created by the debugger client at 212. The message can be a non-invasive call to the server debugger. The message can be created, encoded into the format specified in the communication protocol (e.g., XML, JSON, SOAP, etc.), and can be transmitted to the server using the debug pipeline at 214. On the server, at 216 the message can be received by the network transport protocol, decoded by the message serializer/deserializer and given to the cooperative, non-invasive, non-blocking debugger.

At 210 more debugging activities can occur. For example, the cooperative, non-invasive, non-blocking debugger on the server can modify its internal state so that the cooperative, non-invasive, non-blocking debugger is aware that there is now a breakpoint at a particular point on a particular line. Before the cooperative, non-invasive, non-blocking debugger executes a line, it can check its internal state to see if there is a breakpoint on the line that will execute next. When the cooperative, non-invasive, non-blocking debugger encounters a line on which a breakpoint occurs, the cooperative, non-invasive, non-blocking debugger can go into break mode. The cooperative, non-invasive, non-blocking debugger can suspend execution of the thread on which the user code is running and can create one or more messages at 212. The message or messages can include the name of the file on which the debugger is operating, the line number of the line being executed and so on.

The message can be serialized and encoded according to the communication protocol established at 206 and can be transmitted over the two-way debug communication pipeline established at 206 to the client at 214. Similarly, at the client, the message can be received, decoded, deserialized at 216. The debugger client can act upon the information provided in the message. For example, if the debugger client is executing within an IDE, the IDE can display the state of the remote debugger (e.g., in break mode) to the user by, for example, highlighting the line identified in the message received from the server in the source code file.

Suppose now that the user while in break mode, wants to perform the debug activity at 210 of inspecting a value for a local variable. In response to performing the gestures that select an option to inspect the value for the local variable, one or more messages can be created at 212. The message or messages can ask the debugger on the server to display the current state of the debugger executing on the server. The current state of the debugger can provide the value of the local variable. The message or messages can be serialized, encoded and sent to the server at 214 over the two-way debug communication pipeline. At 216 the server can decode, deserialize the message or messages. At 210 the server debugger can perform the debug activities of reading the message or messages, retrieving the state of the local variable. At 212 the server debugger can create another message, serialize and encode the message and transport the message to the client at 214 and so on. This process can continue until the debug sessions at the client and the server end and the communication pipeline is closed. It will be appreciated that although method 200 depicts debugging activities message generation, encoding and transmission for one debugger client, the sequence of actions depicted from 206 through 216 can occur concurrently for multiple debugger clients, as described above.

It will be appreciated that the actions described above can be repeated for multiple clients so that multiple user debug sessions can be established within a single server process. For example, a first user debug session for a first debugger client of a plurality of debugger clients can execute in a first thread of a server process executing on the server computer. A first instance of the server debugger can be instantiated for the first user debug session. A two-way debug communication pipeline between the server and the first debugger client can be established such that the server computer can initiate a communication with the first debugger client using a one-way network communication protocol such as HTTP as described above. A second user debug session for a second debugger client of the plurality of debugger clients can execute in a second thread of the server process executing on the server computer, the second user debug session instantiating and executing a second instance of the server debugger. A two-way debug communication pipeline between the server and the second debugger client can be established such that the server computer can initiate a communication with the second debugger client even when a one-way network communication protocol such as HTTP is used, as described above. Messages can be sent from client to server or from server to client using the debugging channel.

When the first thread enters a wait state and stops execution, the second thread continues to execute and vice versa. Moreover, it will be appreciated that the server process is not restricted to two threads. One, two or more threads can execute in the server process during the same time period. Moreover, threads executing in the server process are not restricted to executing an instance of the cooperative, non-blocking debugger but regardless of what the threads are doing, debugging activities in one thread do not affect execution of the other threads.

Example of a Suitable Computing Environment

Figure 3:
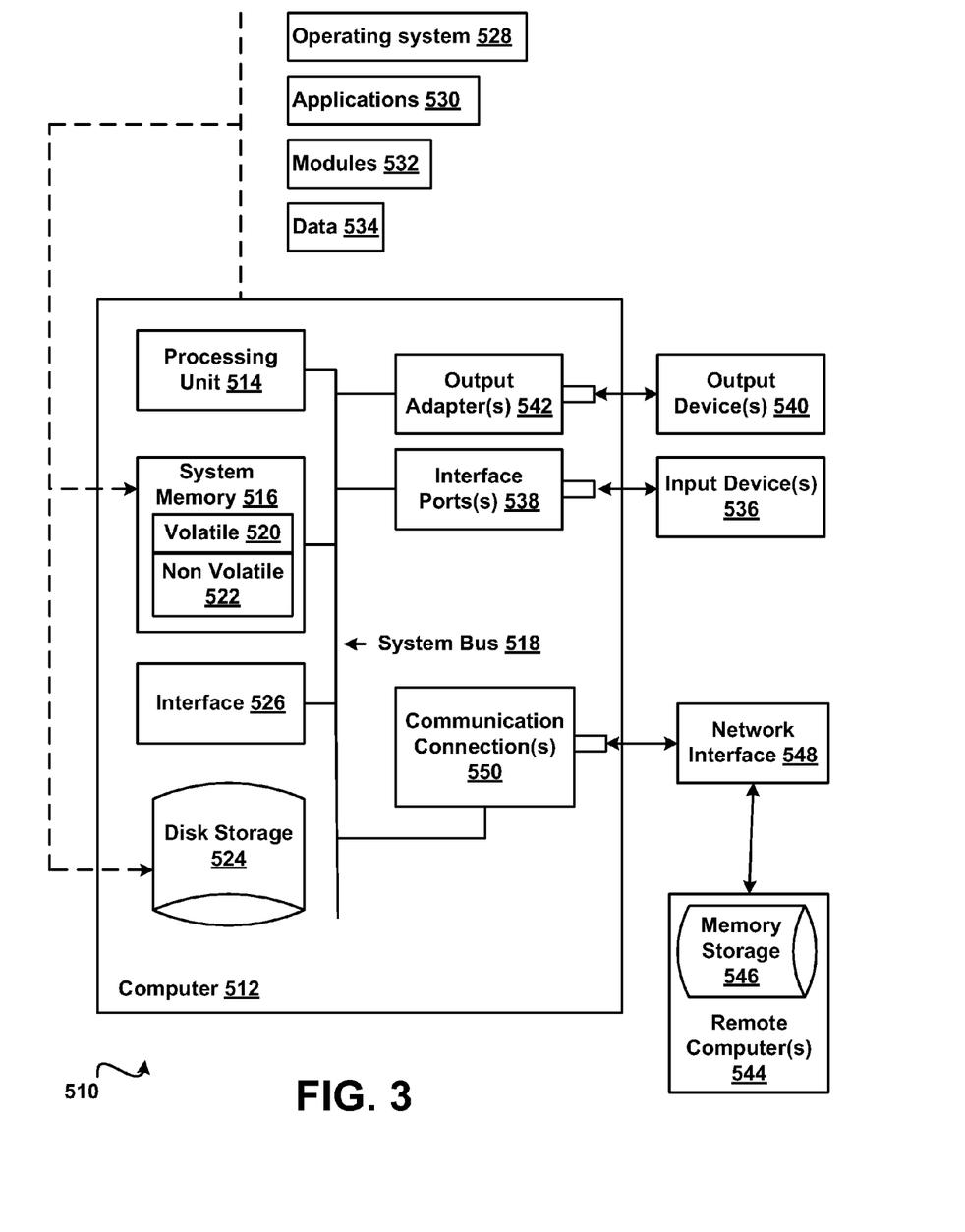
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for low privilege debugging in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
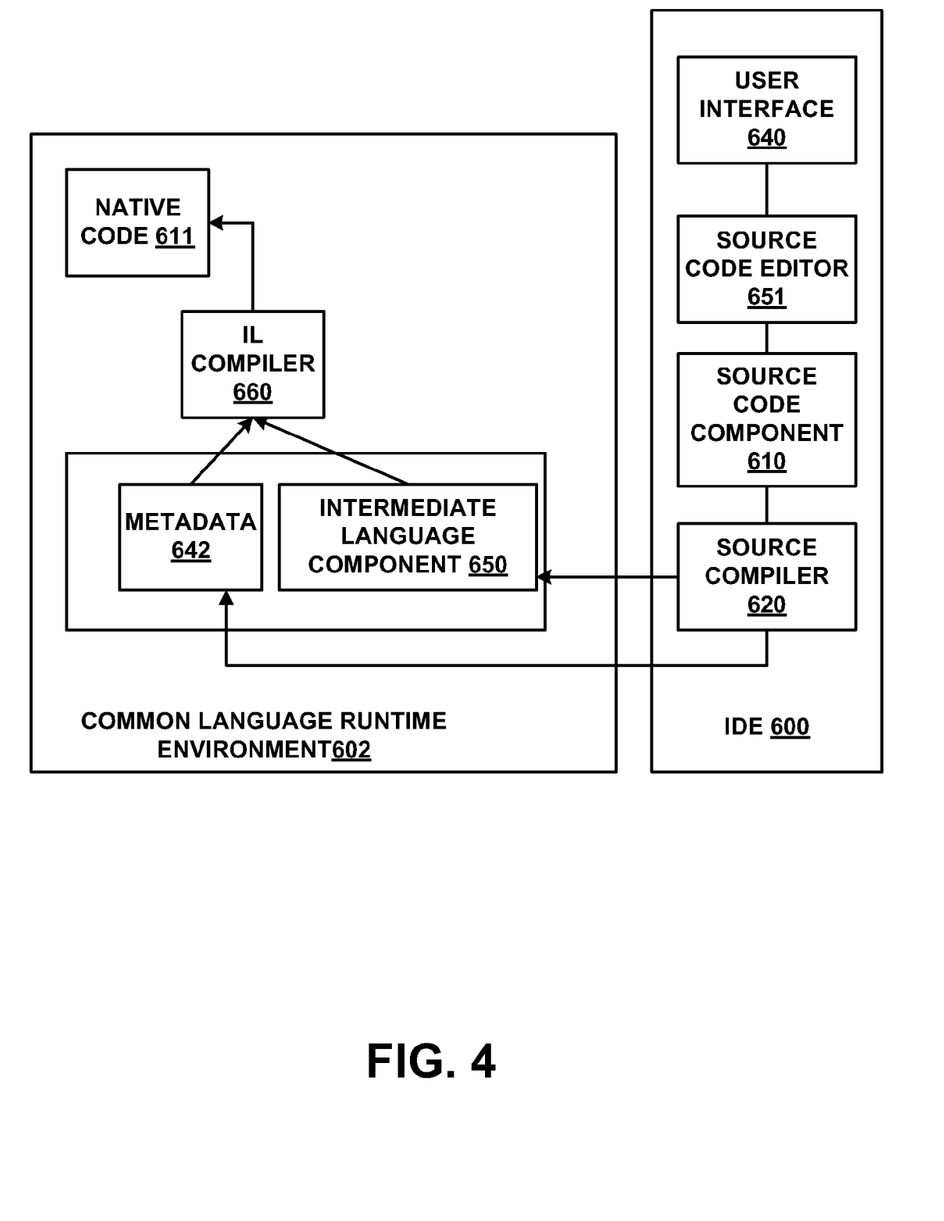
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high-level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
a debugger executing on a server computer in a network environment, the server computer exposing debugging services to a plurality of debugger clients, wherein the debugger instantiates a respective user debug session for each debugger client of the plurality of debugger clients to debug code running within a server process comprising a plurality of threads, each user debug session executing in a respective thread of the plurality of threads and having a respective execution environment in which the code is executing, and wherein, in response to detecting a breakpoint in a first user debug session, a first thread of the plurality of threads is suspended, debug information for a debug message is retrieved, and a second thread of the plurality of threads is not suspended and instead continues to execute;
a module on the server computer, the module establishing a two-way debug communication pipeline for transferring the debug message between the server computer and the debugger client;
a serializer module on the server computer, the serializer module serializing and encoding the debug message; and
a transport module on the server computer, the transport module transferring the debug message from the server computer to the debugger client using the two-way debug communication pipeline;
wherein each execution environment provides the debugging services to support the respective user debug session for cooperative, non-invasive debugging by the respective debugger client.

2. The system of claim 1, wherein:
the server initiates a debug communication to the debugger client using a one-way network communication protocol;
the one-way network communication protocol is HTTP; and
the server computer initiates the debug communication over the two-way debug communication pipeline using long polling.

3. The system of claim 1, wherein the serializer module serializes and encodes the debug message using a protocol, the protocol being XML, SOAP or JSON.

4. The system of claim 1, wherein the transport module uses a network communication protocol to transfer the debug message, the network communication protocol being TCP, UDP, HTTP or SOAP/REST.

5. The system of claim 1, wherein the debug message includes debug information comprising a file identifier, a line number and state information associated with the debugger executing on the server computer.

6. The system of claim 1, wherein the execution environment of the respective user debug session executing on the server computer cooperates with an instance of the debugger in the first thread in the server process.

7. The system of claim 1, wherein the first thread periodically calls a function, wherein in response to calling the function, the first thread is placed in a wait state and wherein in response to receiving a resume event, the first thread resumes execution.

8. A method comprising:
establishing a first user debug session for a first debugger client of a plurality of debugger clients to debug code running within a server process executing on a server computer, the first user debug session executing in a first thread of the server process, the first user debug session executing a first instance of a server debugger and having a first execution environment in which the code is executing;
establishing a second user debug session for a second debugger client of the plurality of debugger clients to debug the code running within the server process, the second user debug session executing in a second thread of the server process on the server computer, the second user debug session executing a second instance of the server debugger and having a second execution environment in which the code is executing;
establishing a two-way debug communication pipeline between the server computer and the first debugger client, wherein the server computer initiates a communication with the first debugger client of the plurality of debugger clients using a one-way network communication protocol;
establishing a two-way debug communication pipeline between the server and the second debugger client; wherein the server computer initiates a communication with the second debugger client of the plurality of debugger clients using a one-way network communication protocol; and
sending a first serialized, encoded debug message from the server computer to the first debugger client using the one-way network communication protocol;

wherein the second thread continues to execute and is not suspended when the first thread encounters a breakpoint, and wherein each of the first and second execution environments provides debugging services to support the first and second user debug sessions for cooperative, non-invasive debugging by the first and second debugger clients, respectively.

9. The method of claim 8, wherein the server computer initiates a communication with the first debugger client of the plurality of debugger clients using the one-way network communication protocol.

10. The method of claim 8, further comprising:
receiving a second debug communication from the first debugger client via the two-way debug communication pipeline between the server computer and the first debugger client.

11. The method of claim 8, wherein the one-way network communication protocol between the server and the first debugger client is HTTP and wherein the server computer initiates the communication with the first debugger client over the two-way debug communication pipeline between the server and the first debugger client using long polling.

12. The method of claim 8, wherein the first serialized, encoded debug message sent from the server computer to the first debugger client is encoded using a protocol comprising one of: XML, SOAP or JSON.

13. The method of claim 8, wherein the one-way network communication protocol is one of TCP, UDP, HTTP or SOAP/REST.

14. The method of claim 8, further comprising generating a debug message on the server computer, wherein the debug message includes debug information associated with the first user debug session, the debug information comprising a file identifier, a line number and state information associated with the first instance of the debugger executing on the server computer.

15. A system comprising a processor and a memory in which computer-executable instructions are stored and which when executed cause the processor to:
establish a first user debug session for a first debugger client of a plurality of debugger clients to debug code running within a server process executing on a server computer, the first user debug session executing in a first thread of the server process, the first user debug session executing a first instance of a server debugger and having a first execution environment in which the code is executing;

establish a second user debug session for a second debugger client of the plurality of debugger clients to debug the code running within the server process, the second user debug session executing in a second thread of the server process on the server computer, the second user debug session executing a second instance of the server debugger and having a second execution environment in which the code is executing;

establish a two-way debug communication pipeline between the server and the first debugger client of the plurality of debugger clients, wherein the server computer initiates a communication with the first debugger client of the plurality of debugger clients using a one-way network communication protocol; and send a serialized, encoded debug message from the server computer to the first debugger client using a one-way network communication protocol;

wherein the first and second debug sessions are implemented such that the second thread continues to execute and is not suspended if the first thread is suspended, and wherein each of the first and second execution environments provides debugging services to support the first and second user debug sessions for cooperative, non-invasive debugging by the first and second debugger clients, respectively.

16. The system of claim 15, comprising further computer-executable instructions, which when executed cause the computing environment to: initiate a debug communication from the server computer using the two-way debug communication pipeline between the server computer and the first debugger client.

17. The system of claim 15, comprising further computer-executable instructions, which when executed cause the computing environment to: initiate a debug communication from the server computer using the two-way debug communication pipeline between the server computer and the first debugger client, wherein the one-way communication protocol is HTTP and wherein the server initiates a communication over the two-way debug communication pipeline between the server computer and the first debugger client using long polling.

18. The system of claim 15, comprising further computer-executable instructions, which when executed cause the computing environment to: encode the serialized, encoded debug message from the server computer to the first debugger client using a protocol, the protocol being XML, SOAP or JSON.

19. The system of claim 15, comprising further computer-executable instructions, which when executed cause the computing environment to: initiate a debug communication from the server computer using the two-way debug communication pipeline between the server computer and the first debugger client using a network communication protocol, the network communication protocol being TCP, UDP, HTTP or SOAP/REST.

20. The system of claim 15, comprising further computer-executable instructions, which when executed cause the computing environment to: generate a debug message wherein the debug message includes debug information associated with the first user debug session, the debug information comprising a file identifier, a line number and state information associated with the debugger executing on the server computer.

* * * * *